Nov. 2, 1965  D. J. MARLEY  3,215,480
HYDRODYNAMIC FOIL BEARINGS WITH BEARING FOIL RETAINING MEANS
Filed Aug. 29, 1963  2 Sheets-Sheet 1

INVENTOR:
DAVID J. MARLEY,
BY
Attorney.

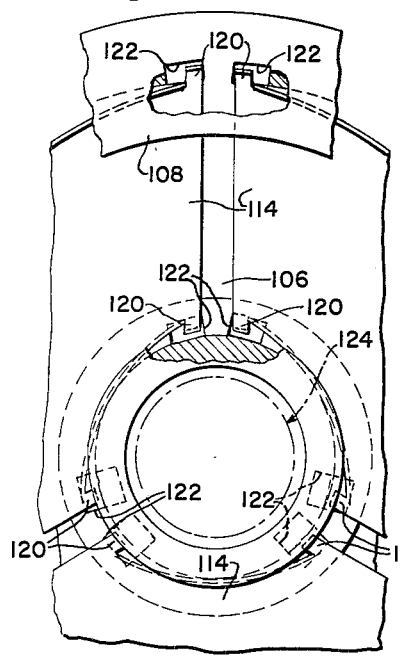
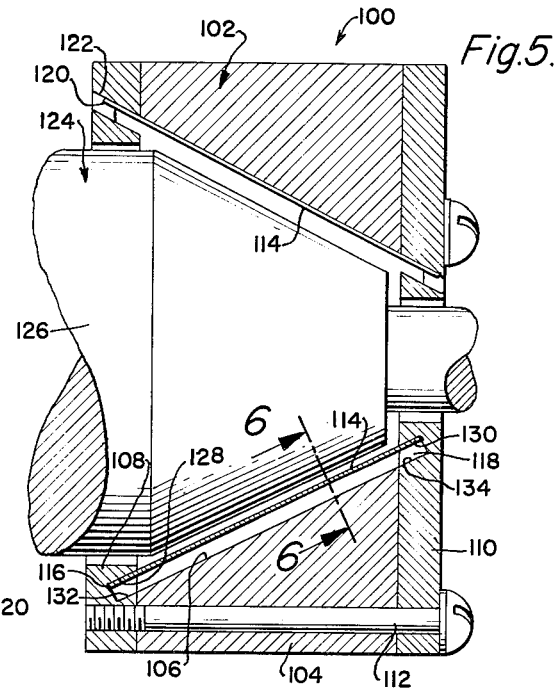
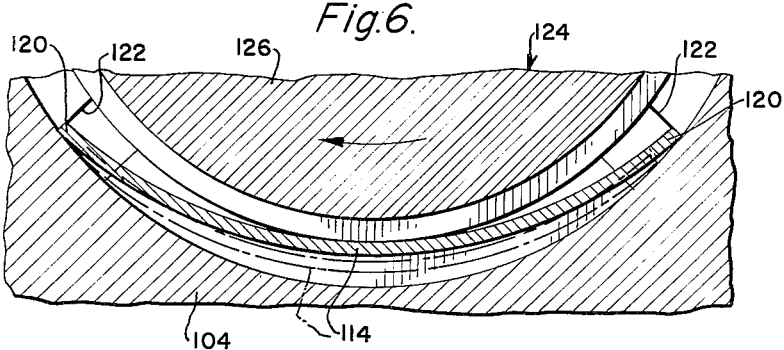

United States Patent Office 3,215,480
Patented Nov. 2, 1965

3,215,480
HYDRODYNAMIC FOIL BEARINGS WITH
BEARING FOIL RETAINING MEANS
David J. Marley, 6811 San Pasqual Circle,
Buena Park, Calif.
Filed Aug. 29, 1963, Ser. No. 305,425
16 Claims. (Cl. 308—121)

This invention relates generally to rotary bearings and more particularly to improvements in fluid film hydrodynamic rotary bearings.

Rotary bearings may be broadly classified into three groups, as follows:

(1) bearings which operate with dry friction between the relatively movable bearing surfaces,
(2) bearings with rolling contact, and
(3) fluid film lubricated bearings.

In dry friction bearings, the relatively movable bearing surfaces rub directly against one another with no effective lubricating film therebetween. In bearings with rolling contact, the relatively movable bearing surfaces are supported for relative movement by intervening rollers, balls, or other similar mechanical anti-friction means. Finally, in fluid film lubricated bearings, the relatively movable bearing surfaces are supported for relative movement by an intervening lubricating film.

Included in the group of fluid film lubricated bearings are externally pressurized bearings, commonly referred to as hydrostatic bearings, and self-acting or self-pressurizing bearings, commonly referred to as hydrodynamic bearings. Hydrostatic bearings receive a constant flow of lubricant under pressure from an external lubricant source which generates the required lubricating film pressure in the bearing. In hydrodynamic bearings, on the other hand, the required lubricating film pressure is generated by the relative movement of the bearing surfaces. Hydrodynamic bearings, however, may be supplied with a constant flow of lubricant from an external source to maintain a sufficient quantity of lubricant in the bearing or to cool the bearing.

Hydrodynamic bearings are well-known in the art and are particularly adapted to high rotary speed applications. As a matter of fact, the rotational speeds of some rotary machines are so high as to preclude the use of bearings other than hydrostatic or hydrodynamic bearings. If, in addition, it is impractical or impossible to provide the required external pressurized lubricant supply for a hydrostatic bearing, as is often the case, the bearing choice is further narrowed to hydrodynamic bearings alone. Hydrodynamic bearings, therefore, are becoming increasingly important in the bearing art.

At this point, attention is directed to the fact that both hydrostatic and hydrodynamic bearings may be designed to use either a liquid or a gaseous lubricant. Air, for example, is commonly used as a lubricant in both hydrostatic and hydrodynamic gas bearings. For simplicity, the present invention is disclosed herein primarily in connection with the use of a gaseous lubricant, such as air or other suitable gas. As will be seen later, however, the improved hydrodynamic bearings of the invention may be designed for use with liquid as well as gaseous lubricants.

Various hydrodynamic bearing configurations are presently available. Unfortunately, however, these existing hydrodynamic bearings, while satisfactory for various applications, possess certain inherent deficiencies which detract from their usefulness and even preclude their use in many present day, ultra-high speed, rotary machines. The deficiencies referred to here involve the extremely high degree of accuracy and precision with which the existing hydrodynamic radial bearings must be machined, the inherent hydrodynamic instability of these bearings, and various other related characteristics thereof.

Actually, the existing hydrodynamic bearing configurations, including radial bearings, thrust bearing, and slider bearings, have been studied, tested, and analyzed in such great detail that the above-stated deficiencies are well-known to and understood by those skilled in the art. Nevertheless, since the present invention is so intimately involved with such deficiencies, it is thought desirable to consider the latter briefly at this point, as they apply to hydrodynamic radial and thrust bearings, in the interest of a more thorough understanding of the present invention.

To this end, consider a simple, fixed-geometry, gas lubricated hydrodynamic radial bearing system comprising a rotor or shaft and a bushing in which the shaft turns. As the shaft is accelerated from rest, the gas between the shaft and bushing is subjected to a shear action; that is to say, the boundary layer of gas adjacent to the bushing tends to remain stationary because of the friction between the bushing surface and the gas, while the boundary layer of gas adjacent the shaft tends to rotate with the latter because of the friction between the gas and the shaft surface. Thus, if the shaft were centered in the bushing, the gas would tend to rotate around the annular clearance space between the shaft and bushing at about one half the shaft speed. Every physical shaft, however, is subjected to radial loading which causes the shaft to assume an eccentric position in the bushing, whereby the annular clearance space between the shaft and bushing is restricted at the position of closest approach of the shaft to the bushing. Such loading may include, for example, the weight of the shaft, in those cases where the shaft axis is other than vertical, centrifugal force acting on the inherent shaft unbalance, assymetrical driving forces on the shaft, gyroscopic forces, in those cases where the shaft is subjected to attitude changes, acceleration and deceleration forces, and so on. The opposing surfaces of the shaft and bush-in converge as they approach the restriction in the direction of shaft rotation and diverge as they recede from the opposite side of the restriction. Accordingly, a wedge-shaped, convergent zone exists between the shaft and bushing surfaces immediately ahead of the restriction, and a wedge-shaped, divergent zone exists immediately behind the restriction. Owing to the internal friction of the gas in the bushing and the friction between the gas and shaft, rotation of the latter wipes or drives the gas into the convergent zone and from the divergent zone, thereby creating a relatively high pressure area in the convergent zone and a relatively low pressure area in the divergent zone. Accordingly, gas tends to leak or squeeze between the shaft and bushing from the high pressure, convergent zone to the low pressure, divergent zone and thereby create a film between the shaft and bushing. As the shaft continues to accelerate, the gas pressure in the high pressure zone increases and eventually becomes sufficient to lift or displace the shaft from the bushing, thereby creating a hydrodynamic bearing film between the bushing and shaft which rotatably supports the latter in radially spaced relation to the bushing. At this time, then, the net transport of gas into the restriction between the shaft and bushing is sufficient to maintain the hydrodynamic film pressure required to support the shaft.

During the initial acceleration of the shaft, the latter tends to rotate on its geometric axis, and centrifugal force acting on the inherently eccentric mass of the shaft causes the latter to orbit or whirl in the bushing as synchronous speed, that is a rotational speed equal to the rotational speed of the shaft on its axis. The orbiting or whirling motion is commonly referred to as synchronous whirl and may involve either or both the cylindrical mode and conical mode. The amplitude of the synchronous whirl increases as the shaft speed approaches its lowest critical speed. In some hydrodynamic radial bearings, most notably gas bearings, maximum shaft speed is limited by synchronous whirl.

Synchronous whirl, however, does not limit maximum shaft speed in all existing hydrodynamic radial bearings, particularly if the lowest critical speed is passed through rapidly. For example, since the amplitude of synchronous whirl becomes maximum at a relatively slow shaft speed, i.e., as the shaft approaches its lowest critical speed, a bearing does not necessarily incur damage even though synchronous whirl carries the shaft into contact with the bushing. Moreover, the hydrodynamic film imposes non-linear damping and cushioning on the shaft which resists contact of the latter with the bushing. In addition, many of the existing bearings are stepped, or provided with extremely small clearances to increase film stiffness, or equipped with means to exert a radial stabilizing load on the shaft, or are otherwise constructed to minimize synchronous whirl. Once the lowest critical speed is exceeded, the shaft tends to rotate on its mass axis, so that while the shaft continues to exhibit a synchronous whirl, the latter does not pose any further problem.

The existing radial bearings, however, exhibit a much more serious form of instability as the shaft approaches a speed approximately twice its lowest critical speed. This instability is known by various names but is most commonly referred to as half-frequency, or half-speed, whirl instability. Half-speed whirl instability results from the fact that as the shaft approaches a speed approximately equal to twice its lowest critical speed it inherently tends to undergo harmonic vibration or whirl at its lowest critical frequency. This harmonic vibration, or half-speed whirl, is superimposed on the synchronous shaft whirl and is stimulated or excited by the pressure of the half-speed, rotating hydrodynamic film, whose average velocity now approaches the lowest critical shaft frequency. As a result, the excursions of the shaft rapidly increase in amplitude and the shaft approaches the bushing. During such half-speed whirl of the shaft, its whirl velocity approximates the average velocity of the fluid film. When this occurs, the hydrodynamic film pressure relative to the half-speed orbiting of the shaft drops to zero, whereby film support is lost with respect to such half-speed orbital motion. The end result of the rapid increase in amplitude of the shaft excursions and the loss of hydrodynamic film pressure is direct contact of the rotating shaft with the bushing. This, then, is half-speed whirl instability. Since contact of the shaft with the bushing occurs at a relatively high shaft speeds, failure in existing gas lubricated hydrodynamic radial bearings almost invariably is due to such half-speed whirl instability.

The existing hydrodynamic cone bearings, which are designed to support both radial and axial shaft loads, are also subject to such half-speed whirl instability. Hydrodynamic cone bearings, however, exhibit certain additional deficiencies. For example, orbital motion of the bearing cone in the bushing, particularly resonant half-speed orbital motion, imparts an axial component of motion to the cone shaft. The existing fixed geometry hydrodynamic cone bearings must also be machined with extreme precision and small tolerances and require a very close fit of the bearing cone in its bushing. As a result, the existing cone bearings require precise alignment of the cone shaft and bushing.

My copending applications Serial No. 294,386, filed July 11, 1963, and Serial No. 294,387, filed July 11, 1963, both entitled Hydrodynamic Shaft Bearing, disclose hydrodynamic radial and cone bearings wherein the shaft is rotatably and resiliently supported by thin, flexible, resiliently compliant bearing foils uniformly spaced about and extending generally circumferentially around the shaft between the latter and a surrounding bushing. Initially, these bearing foils seat directly against the shaft and resiliently position the latter generally centrally in the bushing. As the shaft speed increases, bearing films are hydrodynamically generated between the shaft and bearing foils, the film pressure deflecting the foils away from the shaft, whereby the latter is rotatably supported by the bearing films. Being resiliently compliant, the bearing foils accommodate orbital excursions of the shaft, the surrounding bushing positively limiting the shaft excursions. In addition, the bearing foils exhibit certain unique non-linear cushioning and damping properties which have been found to materially reduce, if not entirely eliminate, half-speed whirl instability. The bearings under discussion, for example, have been operated at speeds in the range of 300,000 r.p.m. to 500,000 r.p.m. without failure due to half-speed whirl instability.

These bearings, however, do possess one disadvantage, to wit, all of the bearing foils directly contact and resiliently press against the shaft when the latter is at rest. As a consequence, the bearing foils initially impose a substantial frictional restraint against shaft rotation which requires a relatively large starting torque to overcome. Moreover, the foils are prone to wear.

A general object of the present invention is to provide improved hydrodynamic radial and thrust foil bearings of the character described wherein the bearing foils are restrained against resilient pressured contact with the shaft when the latter is stationary or rotating at speeds less than that required to generate hydrodynamic bearing films between the shaft and foils, whereby the starting torque required to accelerate the shaft from rest and wearing of the foils are materially reduced.

Other objects, advantages, and features of the invention will become evident as the description proceeds.

In brief, the objects of the invention are attained by providing hydrodynamic foil bearings wherein the bearing foils comprise curved spring metal strips which are spaced about and extend generally circumferentially around the shaft, between the latter and a surrounding bushing, whereby when the shaft is driven in rotation, hydrodynamic bearing films are generated between the foils and shaft, much in the same way as in the bearings of the aforementioned copending applications. The bearing foils also resiliently accommodate and non-linearly dampen and cushion orbital motion of the shaft, as before, whereby half-frequency whirl instability is materially reduced or eliminated and bearing failure due to any half-frequency whirl instability that does exist is avoided.

The improvements of the present invention reside in the fact that radial movement of each bearing foil inwardly toward the shaft is limited in such a way that the foils are restrained against resiliently pressing on the shaft when the latter is at rest. Accordingly, the initial frictional restraint imposed on the shaft by the foils, and the required starting torque, are materially reduced. According to the illustrative practice of the invention, these ends are accomplished by providing the bearing bushings with axially opening, circumferentially extending grooves which receive the circumferentially extending edges of the bearing foils and form shoulders for limiting movement of the foils toward the shaft.

The invention will be better understood from the following detailed description thereof taken in connection with the annexed drawings, wherein:

FIG. 4 is an axial section through a hydrodynamic cone bearing, according to the invention;

FIG. 5 is an enlarged partial view looking at the left-hand end of the bearing in FIG. 4 with the shaft removed and with parts broken away for clarity; and FIG. 6 is an enlarged section taken on line 6—6 in FIG. 4.

Figure 1:
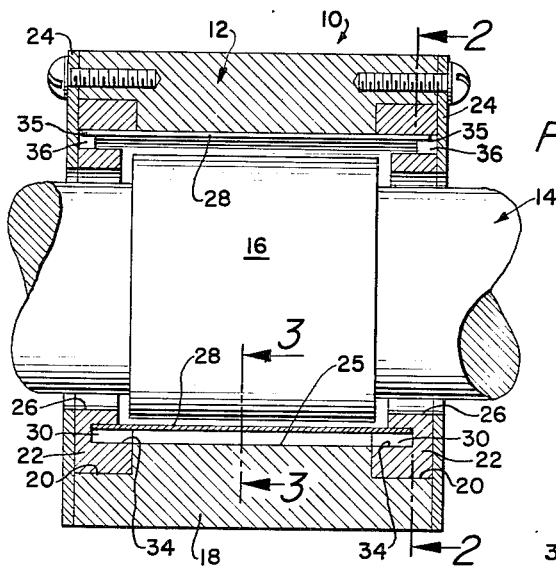
FIG. 1 is an axial section through a hydrodynamic radial bearing according to the invention.
Figure 2:
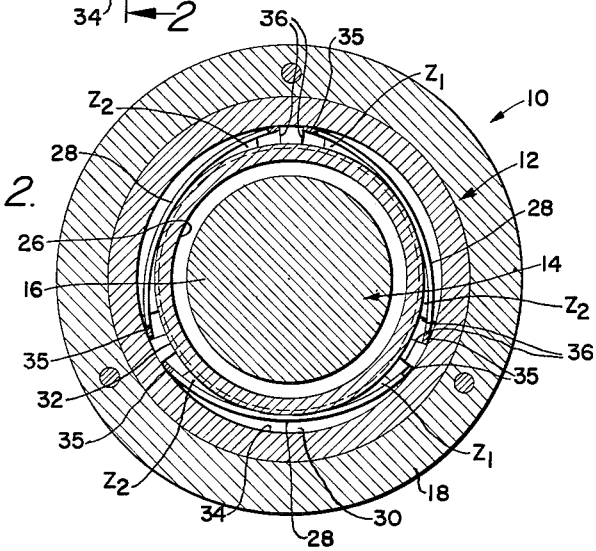
FIG. 2 is a section taken on line 2—2 in FIG. 1.
Figure 3:
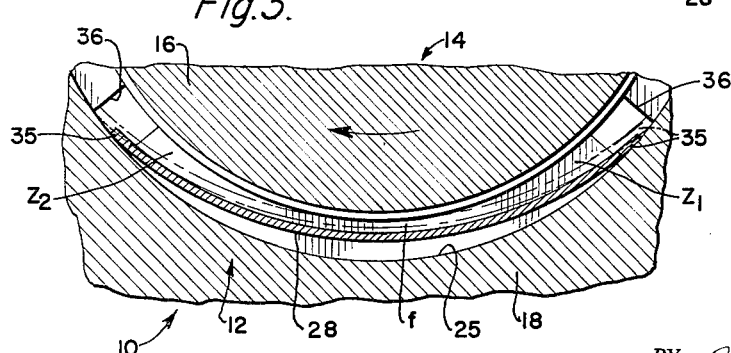
FIG. 3 is an enlarged section taken on line 3—3 in FIG. 1.

The journal or radial bearing 10 illustrated in FIGS. 1 through 3 of these drawings comprises a bushing 12 and a rotor or shaft 14 which turns in the bearing. Shaft 14 has a radially enlarged journal 16 within the bushing. The illustrated bearing is designed to support the shaft 14 between its ends, and to this end, the bushing 12 is open at both ends and the shaft 14 extends completely through the bushing. It will become obvious as the description proceeds, however, that the bearing may be designed to support the shaft at one end, in which case, only one end of the bushing need be open.

Bushing 12 comprises a composite structure including a sleeve 18, the ends of which are counterbored at 20. Seated in these counterbores are a pair of rings 22, the outer faces of which are flush with the end faces of the bushing sleeve 18. Rings 22 are retained in the counterbores by annular plates 24 bolted to the sleeve. Bore 25 in the bushing sleeve is slightly larger in diameter than the journal 16 of the shaft 14. Accordingly, a narrow annular clearance space or gap exists between the journal and the bushing sleeve. The end rings 22 straddle the shaft journal 16 and have central shaft receiving openings 26 which are larger in diameter than the shaft 14 but somewhat smaller in diameter than the journal.

Positioned in the annular clearance space between the shaft journal 16 and the bushing sleeve 18 are three thin, flexible, resiliently compliant bearing foils 28. These bearing foils are uniformly spaced about the shaft journal and extend generally circumferentially around the journal. Each foil encompasses about 120° of the journal, as shown. Bearing foils 28 comprise thin blades or strips of spring steel or other suitable metal which, in their unstressed condition, are flat or cylindrically curved to a larger radius than the journal.

The dimension of the bearing foils 28 parallel to the axis of shaft 14 is somewhat greater than the axial length of the shaft journal 16, whereby the circumferentially extending edge portions of the foils extend beyond the ends of the journal. Coaxially formed in the inner surfaces of the end rings 22 are annular grooves 30 which receive the axially projecting, circumferential edges of the bearing foils. The diameter of the radially inner walls 32 of these grooves is just slightly larger than the diameter of the shaft journal 16. The diameter of the radially outer walls 34 of the ring grooves may be equal to or somewhat larger than the diameter of the bore 25 in the bushing sleeve 18. As will be seen shortly, the bearing foils 28 must be restrained against movement in the circumferential direction of the bushing 18 and yet be free to flex in the radial direction of the bushing. To this end, each foil has four lugs or detents 35 at the ends of its circumferential edges which extend axially beyond the latter edges into sockets 36 in the bottom walls of the ring grooves 30. The foil detents have a relatively loose fit in these sockets, whereby the bearing foils are circumferentially restrained and yet free to flex radially.

It will be recalled that the bearing foils 28, in their normal unstressed condition, are flat or curved to a substantially larger radius than the shaft journal 16. When the foils are inserted in the bushing 12, therefore, the circumferentially spaced ends of each foil bear against the wall of the bore 25 through the bushing sleeve 18 and the center of each foil bears against the inner walls 32 of the end ring grooves 30, as best shown in dotted lines in FIG. 3. From the earlier description of the diameter of the inner groove walls 32 relative to the diameter of the shaft journal 16, it is obvious that when the shaft 14 is stationary and centered in the bushing 12, a small radial spacing or clearance exists between the centers of the bearing foils and the journal, the clearance increasing toward the end of each foil. The optimum clearance between the shaft journal and bearing foils is dependent upon the diameter of the shaft journal 16. The same is true of the diameter of the bore 25 in the bushing sleeve 18 and the thickness of the bearing foils, the foil thickness, of course, being dependent, as well, on the anticipated lateral shaft load. In a typical bearing, however, the clearance between the shaft journal and the centers of the bearing foils is on the order .0003 in. for each inch of journal diameter and the diameter of the bushing sleeve bore is on the order of .015 in. larger than the shaft journal for each inch of journal diameter. The bearing foil thickness is on the order of .006 in. for each inch of journal diameter. In a typical bearing according to the invention, therefore, the shaft journal has limited freedom of lateral movement in the bushing, the maximum displacement of the journal from its centered position being on the order of .0015 in. It is evident, of course, that when the shaft 14 is at rest, the shaft journal will rest on one foil or on the adjacent ends of two foils.

Assume now that the shaft 14 is accelerated from rest, initially, no effective hydrodynamic bearing films will exist between the bearing foils 28 and the shaft journal 16, whereby the latter is directly rotatably supported by the foils as the shaft starts turning from rest. In the present bearing, however, the bearing foils are restrained, by engagement with the inner walls 32 of the bushing end ring grooves 30, from resiliently pressing in against the shaft journal, whereby the latter is not initially resiliently gripped by the foils. Thus, the starting torque required to accelerate the shaft from rest is minimized. As the shaft turns, the air or other gas in the bushing is subjected to a shear action, the boundary layer of gas adjacent the bearing foils tending to remain stationary and the boundary layer of gas adjacent the shaft journal tending to rotate with the latter. When rotating in the direction indicated in the drawing, therefore, the shaft journal wipes or transports the air or other gas in the bushing into the convergent wedge-shaped zones $Z_1$, defined between the journal and the leading ends of the bearing foils 28, and from the divergent wedge-shaped zones $Z_2$, defined between the journal and the trailing ends of the foils, thereby creating a relatively high pressure area in each zone $Z_1$ and a relatively low pressure area in each zone $Z_2$. Continued acceleration of the shaft 14 eventually increases the gas pressure in the zones $Z_1$ sufficiently to create effective hydrodynamic bearing films $f$ (FIG. 3, only one shown) between the shaft journal and the bearing foils. The initial clearance between the shaft journal and bearing foils is such that when the hydrodynamic bearing films $f$ are created, the bearing foils are deflected outwardly slightly, whereby the shaft journal is rotatably supported entirely by the films. The gas in the bushing now tends to rotate or whirl around the annular space between the journal and foils at an average velocity approximately equal to one half the shaft speed.

During initial acceleration of the shaft 14, the latter tends to rotate on its geometric axis, and centrifugal force acting on the inherent eccentric mass of the shaft causes the latter to undergo synchronous whirl. One advantage of the present hydrodynamic bearing over the conventional fixed geometry hydrodynamic bearings resides in the fact that the bearing foils 28, being compliant, yield to accommodate such synchronous whirl, whereby the possibility of bearing failure due to synchronous whirl is minimized or eliminated. In this regard, attention is directed to the fact that the spring tension in the bearing foils is balanced by hydrodynamic film pressure on the foils so that any change in film pressure is reflected in an immediate deflection of the foils either in or out, depending upon whether the film pressure increases or decreases. As will be seen shortly, this immediate response of the bearing foils to changes in film pressure plays a highly important role in minimizing or eliminating half-speed whirl instability in the bearing. At this point, however, let us consider such film pressure response of the bearing foils in relation to synchronous whirl of the shaft.

As the shaft journal 16 orbits toward a bearing foil 28, or toward the adjacent ends of two foils in its synchronous orbital progression around the bushing, the hydrodynamic film pressure between the journal and the approached foil or foils tends to increase. This increase in film pressure reacts on the approached foil or foils and deflects the latter outwardly against the inherent elasticity of the foils, whereby the proper hydrodynamic film pressure and thickness are maintained between the journal and foils. As the shaft journal recedes from a bearing foil, on the other hand, the hydrodynamic film pressure between the foil and journal tends to decrease so that the spring tension on the foil pulls the latter inwardly toward the journal, thereby maintaining the proper hydrodynamic film pressure and thickness. Thus, as the synchronously orbiting shaft journal progresses around the bushing, the bearing foils flex in and out in such a way that, in effect, they follow the orbiting shaft and thereby maintain a relatively uniform hydrodynamic film pressure and thickness about the shaft. As will be seen later, the bearing foils, the hydrodynamic bearing films, and certain dynamically induced static gas films behind the foils are effective to dampen both the synchronous shaft whirl discussed above and the half-speed shaft whirl discussed later.

The effective compliancy of the present bearing permits the latter to accommodate both the cylindrical and conical modes of synchronous whirl. The amplitude of synchronous whirl becomes maximum as the shaft 14 passes through its lowest critical speed. When this speed is exceeded, the shaft commences rotation on its mass axis, whereby synchronous whirl, while it continues, is no further problem.

At this point a further advantage of the present bearing should be considered. As is well-known in the art, the natural or resonant frequency of a shaft supported in a hydrodynamic bearing, and its harmonic frequencies or speeds, are dependent on several factors including rotor stiffness and mass, and the effective spring rate of the bearing. For example, in the case of a shaft of given mass, stiffness, etc., turning in a hydrodynamic bearing, the lowest or fundamental resonant speed of the shaft is directly related to the ratio of the bearing spring rate to the shaft mass. Thus the lowest critical speed of a shaft turning in a fixed-geometry hydrodynamic bearing, wherein the bushing is rigid and thus has a high spring rate, is relatively high, at least compared to the lowest critical speed of an equivalent shaft turning in the present hydrodynamic bearing.

The spring rate of the present bearing which determines the lowest critical speed, for example, is the spring rate of the bearing foils 28. Since the spring rate of these foils, and therefore the ratio of foil spring rate to shaft mass, is very low, the lowest critical rotor frequency is low. As a result, when the shaft 14 is accelerated from rest, the lowest critical speed is passed through early, at a relatively low shaft speed. Synchronous whirl of the shaft at this low critical speed is of relatively small amplitude. Accordingly, even though the excursions of the shaft during such synchronous whirl should carry the shaft into contact with the bearing foils 28, the possibility of damage is minimized or eliminated.

As the shaft 14 continues to accelerate, it approaches the more serious critical speed, namely a speed equal to twice its lowest critical speed, at which failure occurs in most existing fixed geometry and other conventional hydrodynamic bearings due to half-speed whirl instability. The basic bearing foil configurations embodied in the present foil bearings appreciably reduce or entirely eliminate such half-speed whirl instability and avoid bearing failure due to any half-speed whirl instability that does exist. Thus, as noted in the aforementioned copending patent applications, the hydrodynamic bearings disclosed therein, which embody the same basic bearing foil configurations as the present foil bearings, have been successfully operated at speeds in the range of 300,000 r.p.m. to 500,000 r.p.m. As also noted in the copending applications, the exact manner in which these bearing foil configurations operate to minimize or eliminate half-speed whirl instability is not known. However, some of the actions which are either known or thought to occur in the bearings and which appear to contribute to the success of the present bearings are discussed below.

It will be recalled from the earlier discussion of half-speed whirl instability that the latter occurs as a result of the inherent tendency of the shaft to vibrate or whirl at its lowest critical frequency and the self excitation of this vibration into a resonant shaft whip by the hydrodynamic film pressure and other forces active on the shaft as the latter approaches a speed equal to twice the lowest critical speed. Bearing failure occurs when the orbiting velocity of the shaft approximates the average velocity of the rotating hydrodynamic film, which results in loss of hydrodynamic film support relative to the half-speed orbital motion of the shaft and contact of the rapidly rotating shaft with the bushing. In other words, for half-speed whirl instability and bearing failure to occur, it is necessary (1) that the hydrodynamic film pressure and other forces active on the shaft excite the latter into a resonant whip or whirl at the lowest critical speed of the shaft when the latter is rotating at about twice that speed, and (2) that the shaft undergo a half-speed orbital motion relative to the outer boundary of the hydrodynamic film, i.e. the bearing foils 28.

With regard to (1) above, it is evident from what has been said thus far about the action of the bearing foils 28 that even though the shaft journal 16 orbits in the bushing 12, as the shaft approaches a speed equal to twice its lowest critical speed, the hydrodynamic film thickness remains relatively uniform around the journal; that is to say, as the journal orbits, the bearing foils move in and out as explained earlier, whereby the three hydrodynamic films $f$ remain substantially uniform in thickness. As a consequence, the shaft remains constantly relatively centered, in effect, with respect to the bearing foils. This constant centering of the shaft journal minimizes the tendency of the rotating hydrodynamic films $f$ to excite the shaft into a resonant whip or whirl as it approaches twice its lowest critical speed. Moreover, as will be explained shortly, the flexing of the bearing foils which occurs during orbiting of the shaft journal produces nonlinear damping on the journal. Accordingly, in the present bearing, the tendency for the shaft 14 to break into a resonant whip or whirl as it approaches its twice-critical speed is substantially reduced.

With regard to (2) above, it is evident that since the bearing foils 28 move in and out as the shaft journal 16 orbits, the primary cause of fixed geometry bearing failure, to wit, orbiting of the journal relative to the outer boundary of the hydrodynamic films (i.e. the bearing foils) at the average velocity of the films, is eliminated. In other words, since the shaft journal remains relatively centered with respect to the bearing foils, its half-speed, orbital motion, if any, does not occur relative to the foils, whereby there is no loss of film support relative to such half-speed orbital motion as occurs in fixed geometry hydrodynamic bearings. Moreover, should a reduction in pressure occur in any of the hydrodynamic films $f$, due to the occurrence of some half-speed whirl instability, the adjacent bearing foil immediately springs inwardly, thereby decreasing the clearance between the foil and shaft journal 16. This, of course, immediately restricts gas flow between the foil and journal and restores film pressure to its proper level, so that no loss of hydrodynamic film support can occur.

As the shaft 14 is accelerated above twice its lowest critical speed, other critical speeds may be encountered, such as the speed at which the bearing foils commence resonant vibration. Since the ratio of the foil spring rate to foil mass is very high, however, the latter critical speed is very high, so high in fact, that it may never be encountered.

Reference was made earlier to the damping action produced by the bearing foils 28. This damping action is two-fold and involves both pneumatic damping and mechanical spring damping. With regard to the pneumatic damping effect of the bearing foils, it is evident that a relatively static gas film exists between each bearing foil and the wall of the bushing bore 25. When a foil is thrust toward the wall by the orbiting shaft journal 16, the respective static film is compressed or squeezed. This static film squeeze produces some non-linear damping on the foil and thereby on the shaft 14. The effectiveness of this pneumatic damping action is apparently substantially increased by a pneumatic pumping action which appears to occurs. Thus, while the action is not yet fully understood, it appears that the rapid oscillation or vibration of the bearing foils 38 which occurs during orbital motion of the shaft journal 16 in the bushing 12 creates a pneumatic pumping action that effectively increases the static gas pressure, and thereby the static film stiffness behind the foils. Because of this increased stiffness of the static gas films, the latter apparently impose very effective non-linear damping on the shaft 14 which inhibits half-speed resonant whirl of the journal 16 in the bushing. The static gas films also pneumatically cushion direct contact of the bearing foils against the bushing with a spring rate that increases non-linearly as the foils approach the bushing.

With regard to the mechanical damping action of the bearing foils 28, it is evident that the latter, being resilient, inherently impose damping on the shaft 14. In the present bearing, however, this damping is non-linear. Thus, referring to FIG. 3, it will be observed that as the illustrated bearing foil springs outwardly, that is toward the bushing 12, the effective length of the central unsupported length of the foil decreases, whereby the effective spring stiffness of the foil increases. Similarly, the spring stiffness of the bearing foil decreases as it springs inwardly toward the shaft journal 16. The same applies to the remaining two bearing foils, of course. It is evident, therefore, that as the bearing foils 28 spring out and in to accommodate orbital motion of the shaft journal 16 in the bushing 12, the spring rate of the foil varies non-linearly, whereby the foils impose non-linear spring damping on the journal which also inhibits half-speed resonant whirl thereof. Moreover, as the foils vibrate or oscillate in this way, the ends of the foils rub against the inner surface of the bushing 12, and this rubbing introduces an additional non-linearity into the damping action of the foils.

The foregoing are some of the actions which are known or thought to occur in the hydrodynamic shaft bearing of FIGS. 1 through 3, whereby the latter appreciably reduces or eliminates half-speed whirl instability and avoids bearing failure due to any half-speed whirl instability that does exist. These same actions, of course, occur in the hydrodynamic shaft bearings of the aforementioned co-pending applications. As has already been mentioned, the present bearing improves on the bearings of these applications by providing the bearing foil retainer rings 22 which restrain the bearing foils 28 from pressing directly against the shaft journal 16, when the shaft 14 is stationary and thereby reduce the starting torque required to drive the shaft from rest.

FIGS. 4 through 6 illustrate a hydrodynamic cone bearing 100 embodying the above bearing foil retainer feature of the invention. Bearing 100 comprises a bushing 102 including a sleeve 104 containing a conical bore 106. Seating against the end faces of the bushing sleeve 104 are end rings 108 and 110 which serve as bearing foil retainer rings like the end rings in the bearing 10 of FIGS. 1 through 3. Bushing 104 and foil retainer rings 108, 110 are joined by bolts 112 to form an integral bushing structure. Within the bushing 102 are three thin, flexible, resiliently compliant bearing foils 114 which comprise thin, conically tapered, spring metal strips. Bearing foils 114, in their normal unstressed condition, are flat, or curved to a substantially larger radius than the bushing sleeve bore 106. The circumferentially extending edges of the bearing foils project into coaxial circular grooves 116 and 118 in the retainer rings 108 and 110, respectively, as shown. Each bearing foil is restrained against movement around the retainer ring grooves 116, 118 by engagement of lugs 120 in the foils 114 in recesses 122 in the bottom walls of the grooves. As in the eariler form of the invention, these lugs and recesses are proportioned to permit the bearing foils to freely flex in and out.

Extending through the bushing 102 is the shaft 124 to be rotatably supported. Shaft 124 includes a conical journal or cone 126 disposed within the bushing bore 106. It is evident that when the shaft 124 is at rest, the centers of the bearing foils 114 rest against the radially inner walls 128 and 130 of the retainer ring grooves 116, 118, respectively, and the ends of the foils rest against the outer walls 132 and 134 of these grooves. The retainer grooves are so proportioned that when the shaft 124 occupies its normal axial position, shown, a radial clearance, on the order of that mentioned earlier exists between the shaft cone 126 and the centers of the bearing foils 114. The thickness of the bearing foils themselves is on the same order as the bearing foils in the earlier form of the invention.

During rotation of the shaft 124, the cone bearing 100 behaves in much the same manner as the radial bearing of FIGS. 1 through 3, except, of course, that the cone bearing supports both radial and axial shaft loads whereas the radial bearing supports only radial shaft loads. Thus, when the shaft 124 is at rest, the inner walls 128, 130 of the retainer ring grooves 116, 118 restrain the bearing foils 114 against pressing directly on the bearing cone 126, whereby the starting torque required to accelerate the shaft from rest is minimized. Initially, no hydrodynamic bearing films will exist between the bearing cone and the bearing foils. As the shaft speed increases, however, such hydrodynamic bearing films are generated between the cone and foils and the latter are deflected outwardly out of contact with the retainer ring groove walls 128, 130, as in the earlier form of the invention. Thereafter, the shaft is rotatably supported by these bearing films. As the shaft speed continues to increase, the bearing foils 114 behave in the same way as the bearing foils in FIGS. 1 through 3 to both accommodate and non-linearly dampen orbital motion of the shaft 124 and minimize or eliminate half-speed whirl in the bearing. In addition, the bearing foils in the cone bearing 100 accommodate and non-linearly dampen right-hand axial motion of the shaft 124.

Various modifications of the invention are obviously possible within its spirit and scope.

I claim:

1. A film lubricated shaft bearing comprising:
   a supporting structure having a shaft receiving opening;
   bearing means within said opening including a plurality of relatively thin flexible resiliently compliant bearing foils spaced around said opening and each extending generally circumferentially about a portion only of the opening;
   said bearing foils being supported by said structure at positions spaced along each foil and being spaced from said structure intermediate said positions to provide a plurality of concave bearing surfaces for resiliently positioning a shaft in said opening; and
   means engaging said bearing foils for limiting inward movement of said bearing foils toward the shaft.

2. A film lubricated shaft bearing comprising:
   a supporting structure having a shaft receiving opening;

a plurality of separate relatively thin, flexible resiliently compliant bearing foils uniformly spaced around said opening in a configuration presenting a plurality of concave bearing surfaces;

said bearing foils being supported by said structure at positions spaced along each foil and being spaced from the structure intermediate said positions for resiliently positioning a shaft in said opening; and said structure including retaining means for engaging said bearing foils for limiting inward movement of said bearing foils toward the shaft.

3. A film lubricated shaft bearing comprising:

a bushing having a shaft receiving bore;

a plurality of thin, flexible, resiliently compliant bearing foils within and extending generally circumferentially about said bore in normally spaced relation to the wall of said bore throughout at least a portion of the length of each bearing foil within the bore;

said bearing foils being uniformly spaced around said bore and each foil extending generally circumferentially about a portion only of said bore;

said bearing foils being stressed to resiliently position a shaft in said bore;

said bearing foils having inwardly presented concave bearing surfaces adapted to be supplied with a lubricating fluid and to support the shaft for relative rotation to a speed at least sufficient to generate a hydrodynamic lubricating film between the shaft and each bearing surface, whereby said bearing foils are radially positioned relative to the shaft by hydrodynamic film pressure and resiliently accommodate and dampen orbital motion of the shaft; and said bushing being provided with at least one annular groove for engaging said bearing foils for limiting inward movement of said bearing foils toward the shaft.

4. A film lubricated shaft bearing comprising:

a bushing having a shaft receiving bore;

a plurality of thin, flexible, resiliently compliant bearing foils within and extending generally circumferentially about said bore in normally spaced relation to the wall of said bore throughout at least a portion of the length of each bearing foil within the bore;

said bearing foils being uniformly spaced around said bore and each foil extending generally circumferentially about a portion only of said bore;

said bearing foils being flexed in a configuration which presents a plurality of concave bearing surfaces to a shaft in said bore;

said concave bearing surfaces adapted to be supplied with a lubricating fluid and to support the shaft for relative rotation to a speed at least sufficient to generate a hydrodynamic lubricating film between the shaft and each bearing surface, whereby said bearing foils are radially positioned relative to the shaft by hydrodynamic film pressure and resiliently accommodate and dampen orbital motion of the shaft; and said bushing including shoulder means surrounding the bore at each end of the bushing which engage the edges of said bearing foils for limiting inward flexing of the foils toward the shaft.

5. A film lubricating shaft bearing comprising:

a bushing having a shaft receiving bore;

a plurality of thin, flexible, resiliently compliant bearing foils within and extending generally circumferentially about said bore in normally spaced relation to the wall of said bore throughout at least a portion of the length of each bearing foil within the bore;

said bearing foils being uniformly spaced around said bore and each foil extending generally circumferentially about a portion only of said bore;

said bearing foils being stressed to resiliently position a shaft in said bore;

said bearing foils having inwardly presented concave bearing surfaces adapted to be supplied with a lubricating fluid and to support the shaft for relative rotation to a speed at least sufficient to generate a hydrodynamic lubricating film between the shaft and each bearing surface, whereby said bearing foils are radially positioned relative to the shaft by hydrodynamic film pressure and resiliently accommodate and dampen orbital motion of the shaft; and said bushing having internal coaxial circular grooves receiving the circumferentially extending edge portions of said bearing foils and the radially inner walls of said grooves furnishing shoulders for limiting inward flexing of the foils toward the shaft.

6. A film lubricated shaft bearing comprising:

a bushing having a shaft receiving bore;

a plurality of thin, flexible, resiliently compliant bearing foils within and extending generally circumferentially about said bore in normally spaced relation to the wall of said bore throughout at least a portion of the length of each bearing foil within the bore;

said bearing foils being uniformly spaced around said bore and each foil having a radius of curvature greater than said bore to present a concave bearing surface to a shaft in said bore;

said bearing foils being stressed to resiliently position a shaft in said bore;

said concave bearing surfaces adapted to be supplied with a lubricating fluid and to support the shaft for relative rotation to a speed at least sufficient to generate a hydrodynamic lubricating film between the shaft and each bearing surface, whereby said bearing foils are radially positioned relative to the shaft by hydrodynamic film pressure and resiliently accommodate and dampen orbital motion of the shaft; and said bushing engaging said bearing foils to restrain said bearing foils from circumferential movement within the bore.

7. A film lubricated shaft bearing comprising:

a bushing having a shaft receiving bore;

a plurality of thin, flexible, resiliently compliant bearing foils within and extending generally circumferentially about said bore in normally spaced relation to the wall of said bore throughout at least a portion of the length of each bearing foil within the bore;

said bearing foils being uniformly spaced around said bore and each foil extending generally circumferentially about a portion only of said bore;

said bushing including an annular groove at each end of said bore for engaging the edges of said bearing foils to maintain said bearing foils in a configuration presenting a plurality of concave bearing surfaces for resiliently positioning a shaft in said bore;

said concave bearing surfaces adapted to be supplied with a lubricating fluid and to support the shaft for relative rotation to a speed at least sufficient to generate a hydrodynamic lubricating film between the shaft and each bearing surface, whereby said bearing foils are radially positioned relative to the shaft by hydrodynamic film pressure and resiliently accommodate and dampen orbital motion of the shaft; and detents projecting from the circumferentially extending edges of said foils into recesses in the opposing walls of said grooves for restraining the foils against circumferential movement along said grooves.

8. In combination:

a bearing unit including a supporting structure having a shaft receiving opening;

a shaft positioned in said opening;

bearing means within said opening including a plurality of relatively thin, flexible, resiliently compliant bearing foils spaced around said shaft and each extending generally circumferentially about a portion only of the shaft;

said bearing foils being supported by said structure at positions spaced along each foil and being spaced from said structure intermediate said positions in a configuration in which a plurality of concave bearing surfaces are provided for resiliently positioning a shaft in said opening; and said bearing unit supporting structure restraining said bearing foils from assuming a configuration having a radius of curvature greater than a predetermined maximum for limiting inward movement of said bearing foils toward said shaft to positions wherein the foils are spaced slightly from the shaft when the latter is stationary in a centered position in said opening.

9. A film lubricated shaft bearing comprising:

a bushing having a shaft receiving bore;

a plurality of thin, flexible, resiliently complaint bearing foils within and extending generally circumferentially about said bore in normally spaced relation to the wall of said bore throughout at least a portion of the length of each bearing foil within the bore;

said bearing foils being uniformly spaced around said bore and each foil extending generally circumferentially about a portion only of said bore;

said bearing foils being stressed in a concave configuration to resiliently position a shaft in said bore;

said bearing foils having said concave bearing surfaces to support the shaft for relative rotation to a speed at least sufficient to generate a hydrodynamic lubricating film between the shaft and each concave bearing surface, whereby said bearing foils are radially positioned relative to the shaft by hydrodynamic film pressure and resiliently accommodate and dampen orbital motion of the shaft; and said bushing having internal coaxial circular grooves receiving the circumferentially extending edge portions of said foils; and the inner walls of said grooves having a diameter slightly larger than the diameter of the shaft encompassed by the foils, for limiting inward flexing of the foils toward said shaft to positions wherein the foils are slightly spaced from the shaft when the latter is stationary and centered in said bushing.

10. The subject matter of claim 9 wherein:

the portion of said shaft encompassed by said bearing foils is cylindrical and said bearing foils and the inner wall of said bushing are cylindrically curved.

11. The subject matter of claim 9 wherein:

the portion of said shaft encompassed by said bearing foils as well as the foils and the inner wall of said bushing are conically tapered.

12. A hydrodynamic bearing including the combination of a shaft journal, a sleeve for receiving such shaft journal, a plurality of bearing foils disposed within said sleeve each of which is flexed between the shaft journal and the sleeve to present a generally concave bearing surface to the journal, and at least one end ring joined to said sleeve having an annular groove for receiving the axially projecting circumferential edges of each of said bearing foils to limit the flexing of said bearing foils inwardly toward the journal.

13. Apparatus in accordance with claim 12 in which each of said bearing foils engages at least one detent to limit circumferential movement of the foils.

14. In a hydrodynamic bearing for supporting a rotating shaft, the combination of a plurality of flexed foils providing concave bearing surfaces to support said shaft, a mounting structure for said foils, said mounting structure including an annular groove engaging the peripheral edges of said foils to limit the movement of said foils towards said shaft.

15. Apparatus in accordance with claim 14 in which said foils and said mounting structure include complementary elements engaging one another to form a detent to limit circumferential movement of said foils about said shaft.

16. In a hydrodynamic bearing for supporting a rotating shaft, the combination of a sleeve, a plurality of bearing foils disposed within said sleeve, each including a detent for limiting circumferential movement, each of said bearing foils also including axially projecting circumferential edges, and means engaging said axially projecting circumferential edges of each of said foils for limiting the flexing of said bearing foils inwardly towards said shaft.

References Cited by the Examiner

UNITED STATES PATENTS

| | | | |
|---|---|---|---|
| 835,739 | 11/06 | Sundberg | 308—147 |
| 1,384,173 | 7/21 | Wikander | 308—73 |

DON A. WAITE, *Primary Examiner.*

FRANK SUSKO, ROBERT C. RIORDON, *Examiners.*